United States Patent [19]

Litman

[11] 3,889,251
[45] June 10, 1975

[54] PHOTO ELECTRIC AMBIANT LIGHT OPERATED SURVEILLANCE DEVICE

[76] Inventor: Mitchel Litman, Panorama House, Marine Parade, Canvey Island, England

[22] Filed: Aug. 1, 1973

[21] Appl. No.: 384,600

[30] Foreign Application Priority Data
May 8, 1972 United Kingdom............... 21435/72

[52] U.S. Cl. ................................ 340/279; 250/200
[51] Int. Cl. ........................................... G08b 21/00
[58] Field of Search ........ 340/279, 258 D; 250/200, 250/201, 205, 206, 239, 221; 351/158, 41

[56] References Cited
UNITED STATES PATENTS

| 2,625,594 | 1/1953 | Mathis | 340/279 |
| 2,724,109 | 11/1955 | Skolnick et al. | 340/279 |
| 2,726,380 | 12/1955 | Campisi | 340/279 |
| 3,089,065 | 5/1963 | Worden | 340/258 D |
| 3,340,359 | 9/1967 | Fredkin | 250/200 |
| 3,379,885 | 4/1968 | Nork | 340/279 |
| 3,774,134 | 11/1973 | Kardashian et al. | 340/258 D |

Primary Examiner—Donald J. Yusko
Assistant Examiner—Donnie L. Crosland
Attorney, Agent, or Firm—Frank J. Jordan

[57] ABSTRACT

A surveillance device comprises two photo-sensitive devices arranged to receive light reflected respectively from an eye of the person under survey and from an area of skin adjacent to the eye, a differential amplifier for comparing signals generated by the photo-sensitive devices and means providing an alarm, e.g. an audible and/or visual alarm, when the signals generated by the devices are equal thus indicating that the person's eye has closed.

6 Claims, 4 Drawing Figures

PHOTO ELECTRIC AMBIANT LIGHT OPERATED SURVEILLANCE DEVICE

The invention relates to a surveillance device and more particularly to a device for monitoring a person's level of consciousness.

It is an object of the invention to provide a device which can be used for preventing a person from falling asleep unintentionally for example when the person is in charge of machinery.

According to the invention there is provided a surveillance device comprising two photo-sensitive device arranged to receive light reflected respectively from an eye of the person under survey and from an area of skin adjacent to the eye, means for comparing signals generated by the photo-sensitive device, and means providing an alarm, e.g. an audible and/or visual alarm, when the signals generated by the photo-sensitive device reach predetermined relative values, e.g. when the signals are equal thus indicating that the person's eye has closed.

Preferably the device will be mounted on a frame resembling the frame of a pair of spectacles, and may if desired be incorporated in a pair of spectacles. The photo-sensitive device will be mounted out of the line of sight of the wearer.

The signals from the photo-sensitive device are preferably compared in a differential amplifier. Between the differential amplifier and the alarm device there is preferably arranged a delay circuit which will prevent the device from functioning prematurely, e.g. when the person blinks. As a further safeguard a pair of photo-sensitive devices could be associated with each eye of the wearer.

The warning device may take the form of a buzzer mounted on the spectacles-like frame adjacent to the ear of the wearer, but various alternative arrangements are possible. For example the warning device may take the form of a flashing light, or a device directly exciting the wearer's ear. In addition, the output to the warning device may be used to make a permanent record, e.g. on tape.

It will be appreciated that it is necessary for some light to be present to drive the photosensitive device, but a sufficient level of light might be provided by the illuminated instrument panel of an aircraft. To cater for a wider range of light intensity levels, it may be advantageous to provide two or more pairs of photo-sensitive devices of different sensitivity and means for switching between the different pair of photo-sensitive devices before the pair in use becomes saturated.

The invention is diagrammatically illustrated by way of example, in the accompanying drawings in which.

Figure 1:
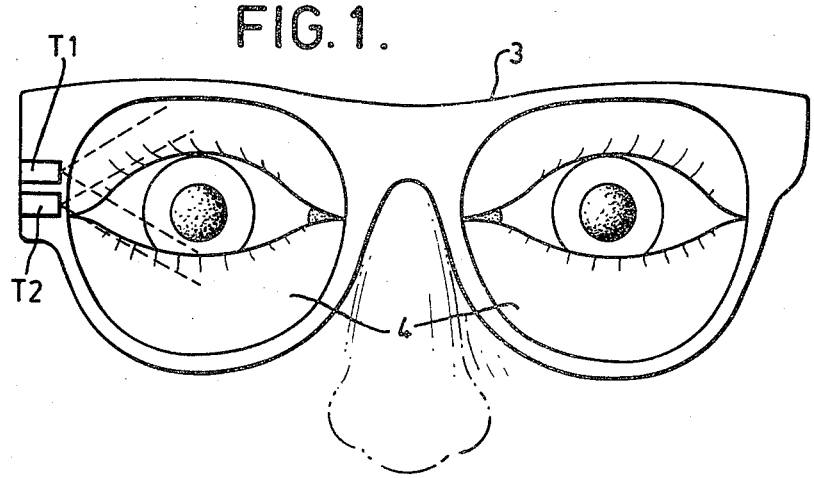
FIG. 1 is a front elevation of the frame of a pair of spectacles carrying a pair of photo-sensitive devices.

In the drawings there is shown a surveillance device intended for use in conditions where the ambient light level is substantially constant, the device being mounted on the frame 3 of a pair of spectacles. The frame carries at a position adjacent to one of the lenses 4 but out of the line of sight of the wearer a pair of photo-electric cells T1 and T2, the cells being disposed adjacent to one another but the cell T2 being arranged to receive light substantially wholly reflected from the eye of the person under survey while the cell T1 is arranged to receive light reflected at least in part from an area of skin adjacent to the eye of the person e.g. from the eyelid. The dotted lines in FIG. 1 indicate the light acceptance angles of the cells.

Figure 2:
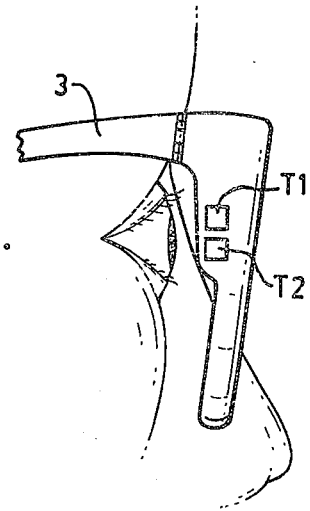
FIG. 2 is a side elevation of part of the spectacles frame.
Figure 3:
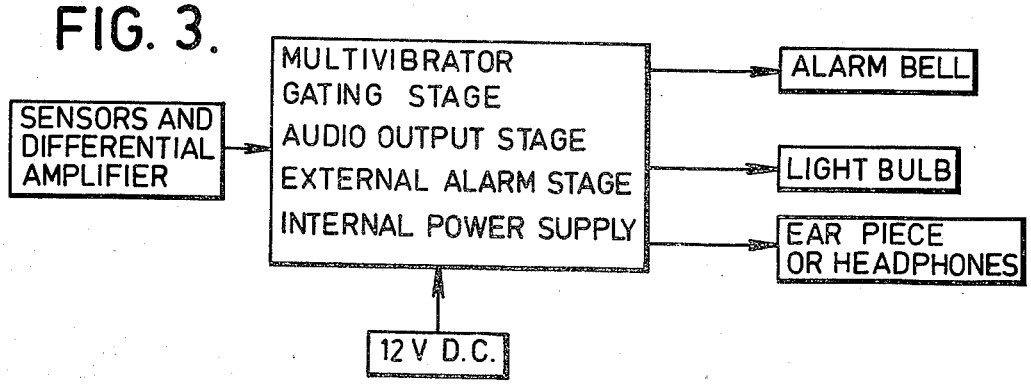
FIG. 3 is a block diagram of the surveillance device.

The signals generated by the cells T1 and T2, which will be different in magnitude due to the different reflective properties of the two parts from which the light is reflected, are amplified by a differential amplifier shown diagrammatically in FIG. 2. If the two input voltages to the differential amplifier are the same, which will indicate that the reflective properties of the areas in the field of view of the cells 1 and 2 are the same, it will be apparent that the person has closed his eye. Under these circumstances the amplifier will trigger an audio output stage which powers an alarm which may for example be a buzzer. However, between the differential amplifier and the audio output stage is a delay circuit which will prevent the device from prematurely triggering the buzzer if the person momentarily blinks. The delay may, for example, be of one second duration depending on the circumstances in which the device is being used.

Figure 4:
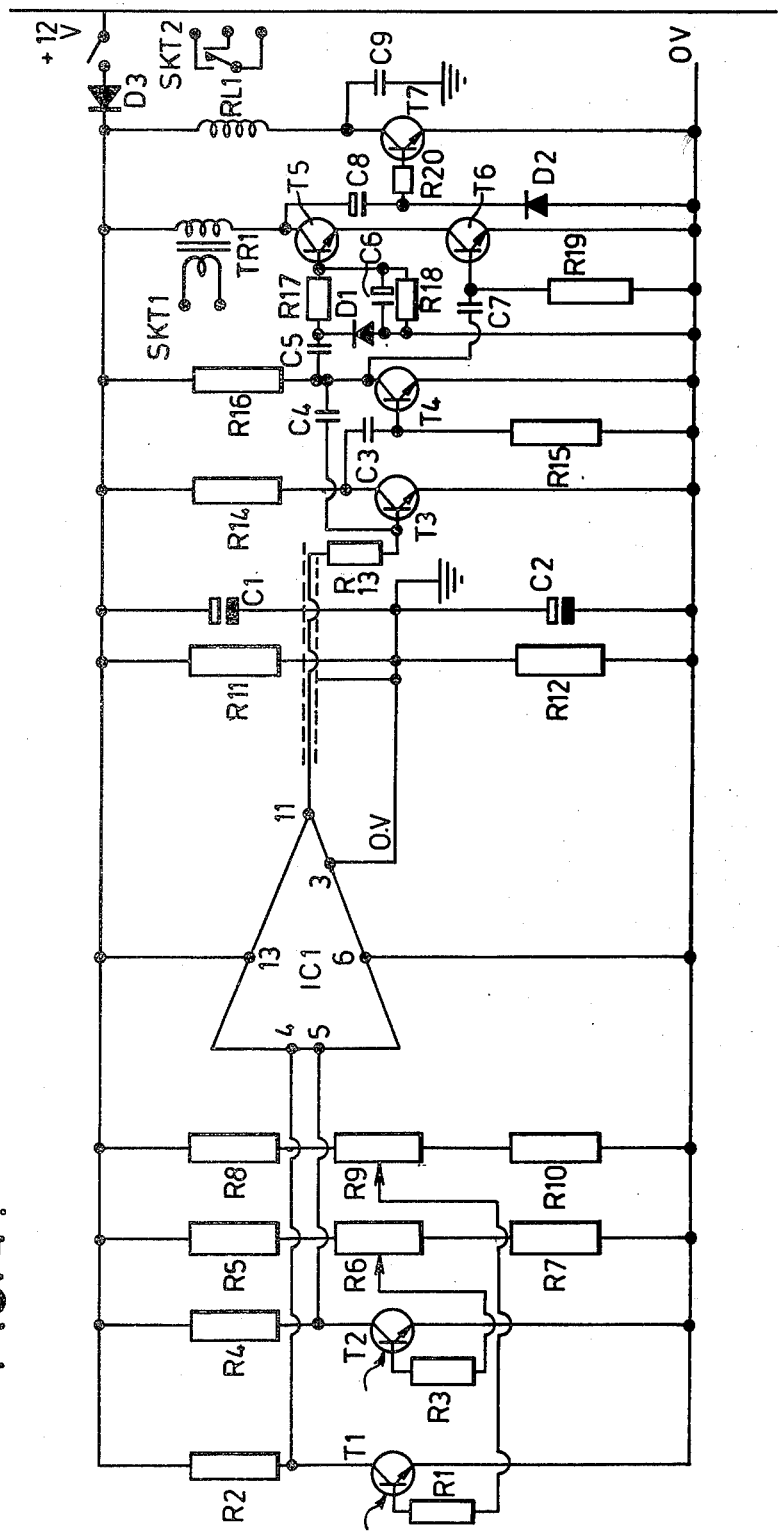
FIG. 4 is a circuit diagram of the device shown in FIG. 3.

With reference to FIG. 4 the bias to the base of the photosensitive device T1 is adjusted by a resistor R9 to near zero volts to earth on pin 4 of the differential DC amplifier IC1. The bias to the base of the photo-sensitive device T2 is adjusted by a resistor R6 so that with the eye open the voltage on pin 11 of the amplifier IC1 begins to go negative. When the eyelid closes the collector voltage of the photo-sensitive device T2 changes and this voltage is fed to pin 5 of the amplifier IC1 and is amplified thus producing a negative voltage change on pin 11 of the amplifier. This negative voltage change is fed to the base of a transistor T3 of a multivibrator section which also includes transistor T4, thus activating the multivibrator. The alternating voltage of the collector of the transistor T4 is then fed via a capacitor C5 to produce a positive voltage across a diode D1. This voltage is applied through a resistor R17 to the base of a transistor T5, delayed by the charging action of a capacitor C6. A resistor R18 leaks away this charge when the eye is open. When the voltage rises sufficiently to switch on the transistor T5, which is used as a gate, the alternating signal fed to the base of a transistor T6 via a capacitor C7 is amplified by the transistor T6 and the signal produced across the secondary winding of a transformer TR1 is fed to an ear piece or headphones via a two way socket SKT1. Following this the signal is fed via a capacitor C3 across a diode D2 to produce a further delayed voltage to switch on a transistor T7. In the conducting state of the transistor T7, a relay RL1 is energized and the circuit continuity to a three way socket SKT2 is made or broken as required by the relay contacts. This facility can be used to produce an external alarm signal or activate other devices e.g. a lightbulb or tape recorder.

It is envisaged that with the use of integrated circuits the device could be made small enough to be incorporated in the frame of the pair of spectacles. It is also thought that the device could be used as a signalling device by paralysed persons.

I claim:

1. A surveillance device comprising two photosensitive devices arranged to receive ambient light reflected respectively from an eye of the person under survey and from an area of skin adjacent to the eye, means for comparing signals generated by the photo-sensitive devices, and a device providing an alarm when the signals generated by the photo-sensitive devices are equal.

2. A surveillance device according to claim 1, wherein the device is mounted on a frame adapted to be supported on the person's head whereby the photo-sensitive devices are disposed adjacent to the eye but out of line of sight thereof.

3. A surveillance device according to claim 2, wherein the frame resembles that of a pair of spectacles.

4. A surveillance device according to claim 1, wherein the signals from the photo-sensitive devices are compared in a differential amplifier.

5. A surveillance device according to claim 4, wherein between the differential amplifier and the alarm device is disposed a delay circuit which prevents the alarm device from functioning prematurely.

6. A surveillance device according to claim 1, wherein two pairs of photo-sensitive devices of different sensitivities are provided.

* * * * *